(12) United States Patent
Pearlson

(10) Patent No.: US 12,679,029 B2
(45) Date of Patent: Jul. 14, 2026

(54) INCREASING THROUGHPUT IN ADDITIVE MANUFACTURING USING A ROTATING BUILD PLATFORM

(71) Applicant: Igneous IP Holdings, LLC, Wales, WI (US)

(72) Inventor: Matthew N. Pearlson, Wales, WI (US)

(73) Assignee: Intrnls, Inc., Wales, WI (US)

( * ) Notice: Subject to any disclaimer, the term of this patent is extended or adjusted under 35 U.S.C. 154(b) by 90 days.

(21) Appl. No.: 18/544,628

(22) Filed: Dec. 19, 2023

(65) Prior Publication Data

US 2024/0131787 A1     Apr. 25, 2024

Related U.S. Application Data

(62) Division of application No. 17/749,315, filed on May 20, 2022, now Pat. No. 11,845,222.

(60) Provisional application No. 63/324,381, filed on Mar. 28, 2022, provisional application No. 63/191,500, filed on May 21, 2021.

(51) Int. Cl.
| | |
|---|---|
| *B29C 64/245* | (2017.01) |
| *B29C 64/124* | (2017.01) |
| *B29C 64/277* | (2017.01) |
| *B33Y 10/00* | (2015.01) |
| *B33Y 30/00* | (2015.01) |
| *B33Y 40/20* | (2020.01) |

(52) U.S. Cl.
CPC .......... *B29C 64/245* (2017.08); *B29C 64/124* (2017.08); *B29C 64/277* (2017.08); *B33Y 10/00* (2014.12); *B33Y 30/00* (2014.12); *B33Y 40/20* (2020.01)

(58) Field of Classification Search
CPC ...................................................... B28B 1/001
See application file for complete search history.

(56) References Cited

U.S. PATENT DOCUMENTS

| | | | |
|---|---|---|---|
| 2022/0127200 A1* | 4/2022 | Chintapalli | B22F 10/10 |
| 2022/0347928 A1* | 11/2022 | Truxel | B29C 44/0461 |

FOREIGN PATENT DOCUMENTS

| | | | | |
|---|---|---|---|---|
| WO | WO-2021130654 A1 * | 7/2021 | | B33Y 30/00 |

* cited by examiner

*Primary Examiner* — JaMel M Nelson
(74) *Attorney, Agent, or Firm* — David H. Judson

(57) ABSTRACT

An additive manufacturing technique uses digital mask-based illumination and a polar-based build environment for increased throughput. In one embodiment, the build environment comprises a rotating element having a surface. A coater is configured to deposit photopolymer material on the rotating element at a given flow rate. As the element rotates and the coater deposits the photopolymer material, a radiation source of an image scanning system projects an array of point sources (an image) onto the photopolymer material for an exposure time to cure a given layer. As the photopolymer material is deposited layer-upon-layer, and for each layer, a control system adjusts a relative position of the coater with respect to the surface, adjusts a speed of rotation of the rotating element, and maintains the flow rate and the exposure time constant.

9 Claims, 12 Drawing Sheets

Throughput Comparison

| Standard Resolution "Normal" Laser Spot Size 100 um | High Resolution "Small" Laser Spot - 20 um | DMD Array nXm pixel pitch - 20um |
|---|---|---|
| 100mm x 100mm process area | 100mm x 100mm process area | 100mm x 100mm process area |
| T = 6 seconds | T = 30 seconds | T = 0.08 seconds |
| | | 75x improvement over 100um |

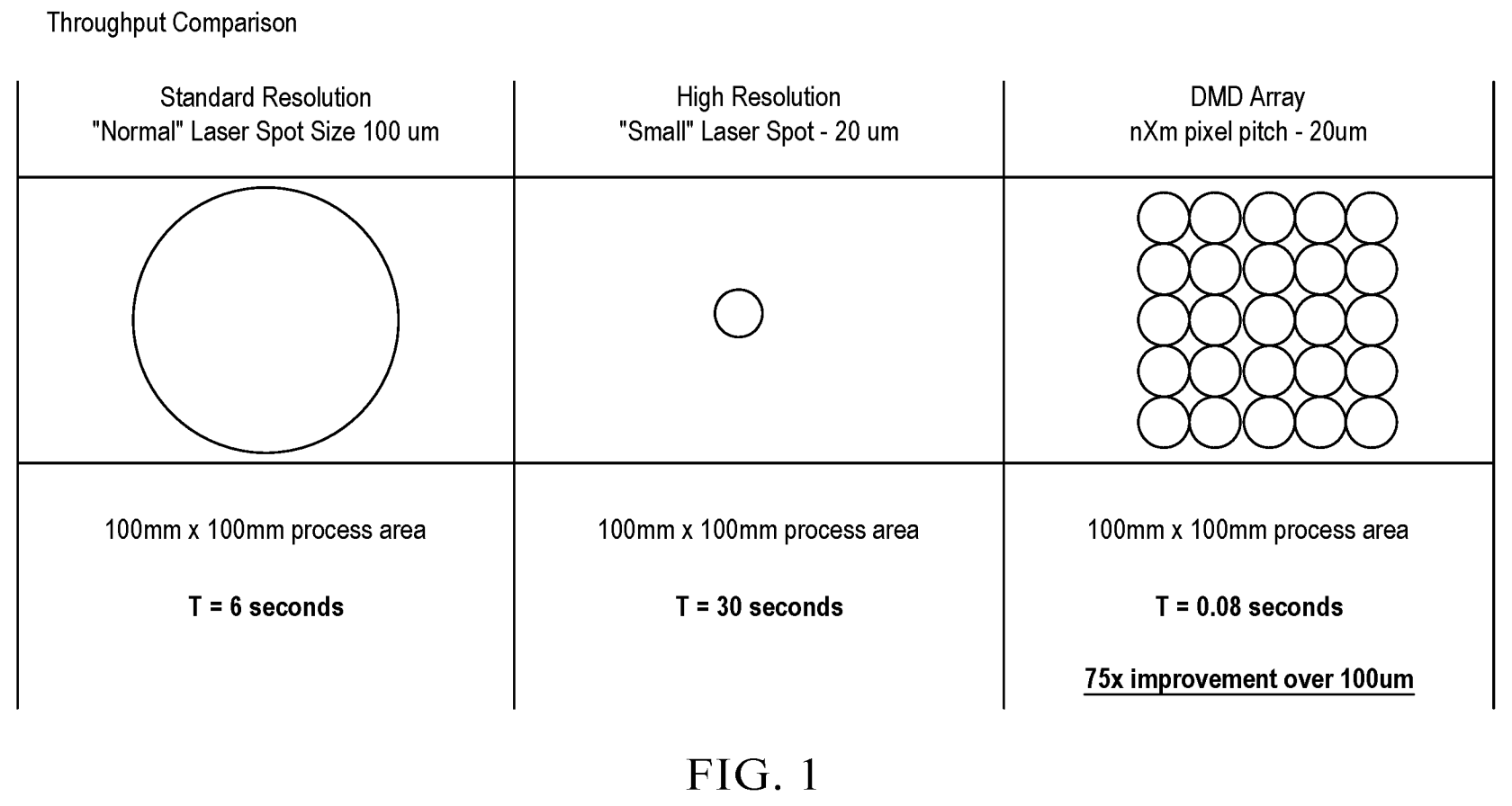

Throughput Comparison

Standard Resolution "Normal" Laser Spot Size 100 um

100mm x 100mm process area

T = 6 seconds

High Resolution "Small" Laser Spot - 20 um

100mm x 100mm process area

T = 30 seconds

DMD Array nXm pixel pitch - 20um

100mm x 100mm process area

T = 0.08 seconds 75x improvement over 100um

FIG. 1

INCREASING THROUGHPUT IN ADDITIVE MANUFACTURING USING A ROTATING BUILD PLATFORM

STATEMENT REGARDING SPONSORED RESEARCH

This invention was made with government support under Contract No. 1938466 awarded by the National Science Foundation. The government has certain rights in the invention.

BACKGROUND

Technical Field

This application relates generally to additive manufacturing techniques.

Brief Description of the Related Art

Stereolithography is a form of three-dimensional (3D) printing technology used for creating models, prototypes, patterns and production parts in a layer by layer fashion (so-called "additive manufacturing") using photo-polymerization, a process by which light causes chains of molecules to link, forming polymers. Those polymers then make up the body of a three-dimensional solid. Typically, an additive manufacturing process uses a build platform having a build tray submerged in a liquid photosensitive material. A 3D model of the item to be manufactured is imported into an associated 3D printer software, which software slices the 3D model into 2D images that are then projected onto the build platform to expose the photopolymer.

While additive manufacturing techniques have proven to produce satisfactory results, they have certain limitations that have prevented their widespread use for general manufacturing. One such problem is low throughput. In particular, increasing printing resolution requires shrinking the spot size used in an additive manufacturing process. In laser-based stereolithography, this is the laser spot size on the build surface. In DLP based photopolymerization systems, the spot size refers to the individual micromirror pixel pitch used in the array. Shrinking the spot size reduces printer throughput by a factor of $x^2$. For example, reducing the spot size from 100 um (common in the industry) to 20 um is a factor of 5× reduction of the diameter. The area throughput, however, is 25× lower ($5^2$). So, if it takes one (1) day to print a part with 100 um spot size, then it will take 25 days to print the same part with 20 um spot size resolution.

BRIEF SUMMARY

According to this disclosure, throughput of an additive manufacturing process is significantly increased by increasing the effective resolution of a large spot size with a digital mask, and providing an image scanning system to move that image across the build area. The image scanning system may be a digital micromirror device (DMD) array. In addition, in lieu of using a cartesian-based build platform that moves up or down with respect to the radiation source, preferably the high-throughput foam printing herein is based on continuous printing onto a polar-based rotating cylinder platform. The combination of these techniques allows high throughput due to the large spot size, but still maintains high spatial resolution.

In particular, and in one embodiment, a build environment comprises a rotating element having a surface. A coater is configured to deposit photopolymer material (e.g., radiation-curable foam) on the rotating element at a given flow rate. As the element rotates and the coater deposits the photopolymer material (layer-upon-layer), a radiation source of the image scanning system projects an array of point sources (an image or pattern) onto the photopolymer material for an exposure time to cure a given layer. As the photopolymer material is deposited layer-upon-layer, and for each layer, a control system adjusts a relative position of the coater with respect to the surface, adjusts a speed of rotation of the rotating element, and maintains the flow rate and the exposure time constant.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 1 is a chart comparing throughputs of known prior art techniques versus the digital micromirror device (DMD) array technique of this disclosure;

FIG. 12b is a top-down view of the foam surface with image patterning details using the approach shown in FIG. 12a;

FIG. 13b is a top-down view of the foam surface with image patterning details using the approach shown in FIG. 13a.

DETAILED DESCRIPTION

Figure 2:
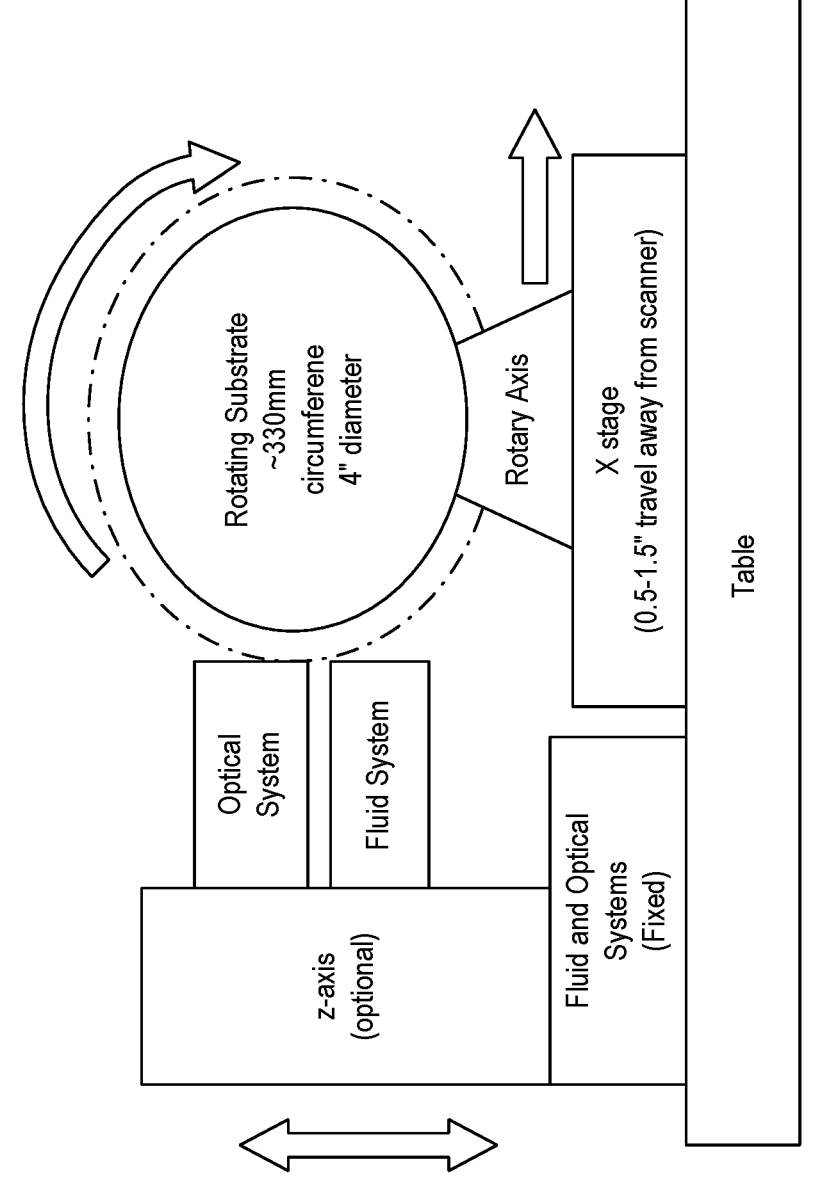
FIG. 2 depicts an embodiment of an additive manufacturing system according to the principles of this disclosure.

The following presumes familiarity with vat photopolymerization manufacturing methods and systems. As is well-known, stereolithography is a known technique for making solid objects by successively "printing" thin layers of a curable material, e.g., a radiation-curable material, one on top of the other. To this end, a programmed movable spot beam of light (e.g., UV) shining on a surface or layer of radiation-curable liquid is used to form a solid cross-section of the object at the surface of the liquid. The object is then moved, in a programmed manner, away from the liquid surface by the thickness of one layer and the next cross-section is then formed and adhered to the immediately preceding layer defining the object. This process is continued until the entire object is formed. Using this printing approach, many different types of object forms can be created using the computer to help generate the programmed commands and to then send the program signals to the stereolithographic object forming subsystem.

According to this disclosure, an additive manufacturing method and system using a projected DMD array in lieu of a standard resolution laser spot size or a high resolution small laser spot size. The relative throughputs are depicted in the chart shown in FIG. 1. As can be seen the DMD array-based approach herein provides a significant throughput improvement but without sacrificing resolution. As shown, and in one embodiment, the DMD projects as an array of individual point sources, sometimes referred to as an "image" or "image pattern."

A manufacturing system that implements the technique herein has various components. These include a radiation source for material processing. The radiation source may be an light emitting diode (LED), a laser diode (LD), a high intensity discharge lamp (HID), or the like. In addition, the system includes a digital mask, which is a subsystem used to selectively transmit or not (mask) radiation to the build surface. Examples include: DMD (e.g., a Texas Instruments® DLP chip), an LCD screen, a micro-LED display (a so-called "direct display" device, which is both the source and digital mask in such case), MEMS (micro electro mechanical system), or the like. A direct display device is an array of emitting devices that can be selectively illuminated creating an image without the need for a separate light source (e.g., backlight) and mask. The manufacturing system also includes an optical system, which is a series of optical elements required to shape, image and/or re-image the mask used for selective curing of the material. The optical system typically comprises one or more collimating lenses, a beam expander/reducer, and F-theta/field scan lens, and the like. The manufacturing system also includes a scanning system, e.g., a moving minor system that is used to reposition the image across the build plate. Examples includes a polygon scanner, a galvanometer scanner, a resonant scanner, a galvo-resonant scanner, and combinations thereof. Finally, a build area where material is deposited and selectively cured is provided. The build area is polar. In the polar embodiment, layers are wrapped around a rotating axis continuously. This type of printing is sometimes referred to herein as "roll-on-roll." The polar motion embodiment aims to further increase the speed of production. This embodiment uses a rotating substrate to accumulate material, which is selectively cured by the image scanning system. Because the rotating substrate does not need to change directions like the cartesian motion embodiment, it can sustain much higher average processing speeds as compared to existing photopolymer printing techniques.

FIG. 2 depicts the above-described components of the manufacturing system, in this case implementing using the polar-based build environment.

Figure 3:
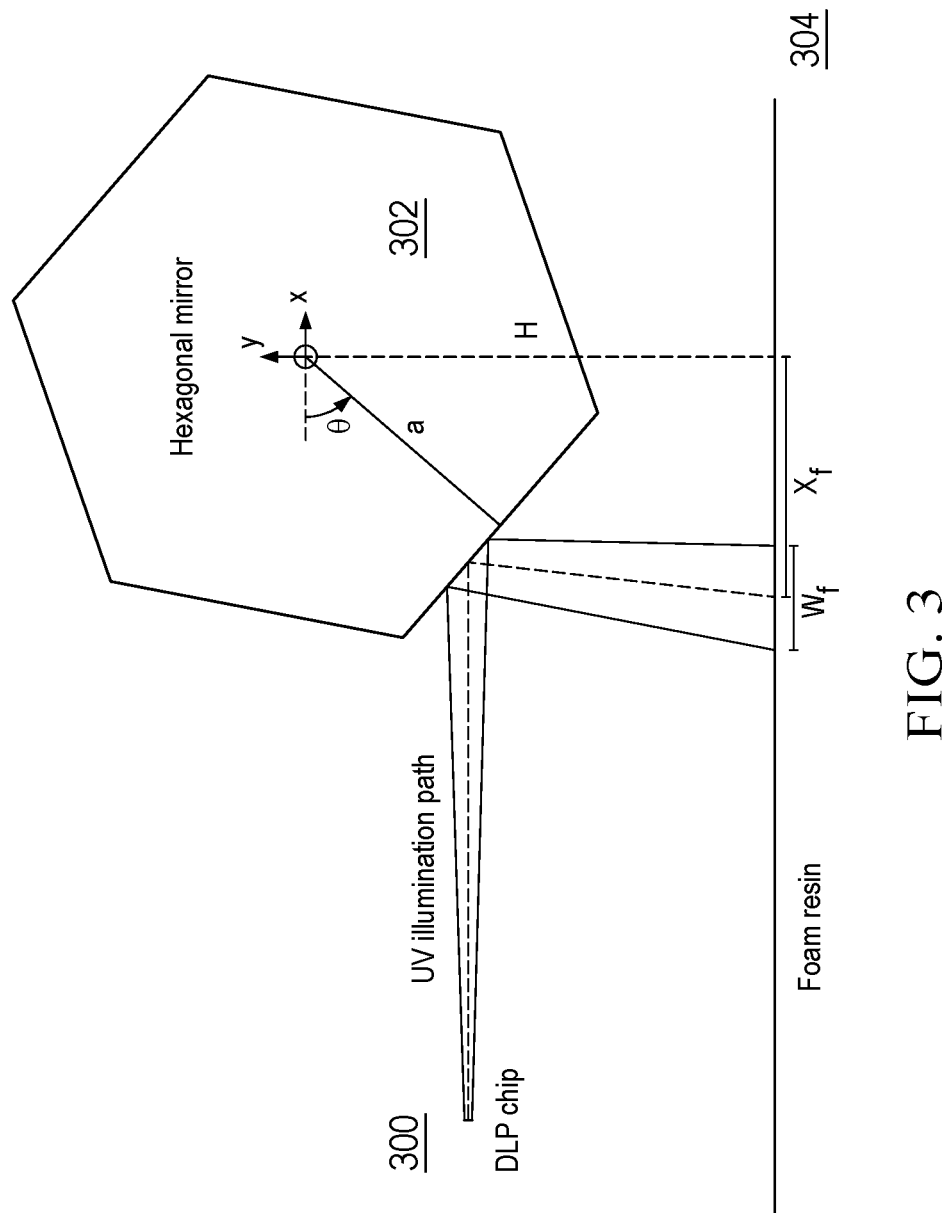
FIG. 3 depicts an illumination path that is implemented in an embodiment of the additive manufacturing system of FIG. 2 using a moving mirror system.

FIG. 3 illustrates one embodiment depicting the digital mask (e.g., Digital Light Processing (DLP) semiconductor DMD chip) 300 and how it interacts with the moving minor system 302 to control the illumination path of the UV light used to cure foam deposited on a rotating platform 304. In an alternative, the polygon scanner shown in FIG. 3 is replaced with galvo scanning mirrors.

Figure 4:
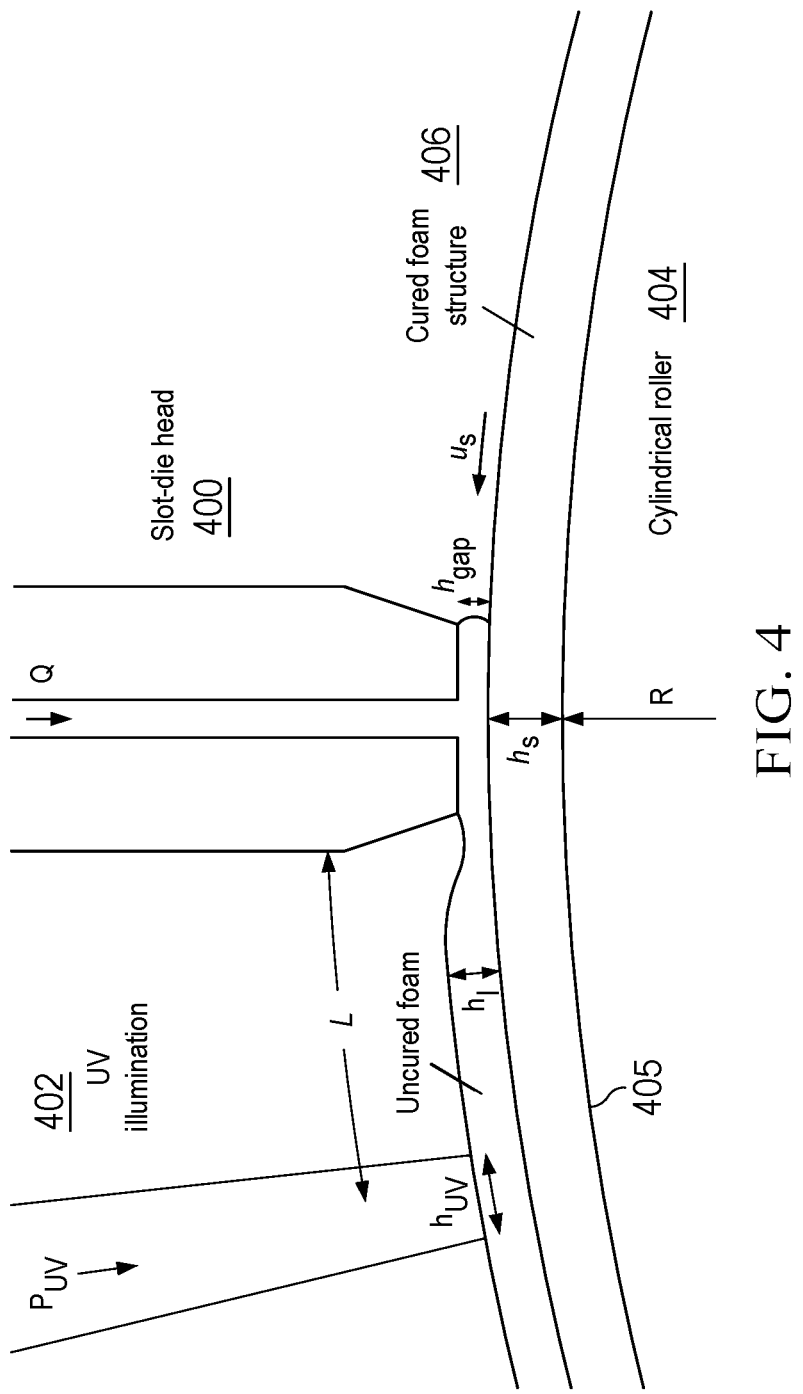
FIG. 4 depicts a high-throughput foam printing method based on continuous printing onto a rotating cylinder platform according to this disclosure.

FIG. 4 depicts additional details showing the build surface in an embodiment. In particular, a slot-die head 400 is shown depositing a continuous layer of foam, which is then cured by UV illumination 402 (from a radiation source) behind the slot-die head. In this embodiment, the slot die-coater and UV light are fixed, and the roller 404 spins counter-clockwise underneath. The roller has a surface 405. A photopolymer layer (e.g., a radiation-curable foam) is shown on top of a previously cured photopolymer structure 406. This method affords a number of advantages over planar deposition embodiments, including continuous fabrication, without sequential reset of layer and blade, and more uniform control of time between deposition and curing.

As depicted in FIG. 4, the roller 404 spins counter-clockwise, but this is not a requirement. In a variant embodiment, the roller spins clockwise. In such case the layer is rotated (in almost one complete rotation) before the imaging is applied.

The slot-die head 400 depicted in FIG. 4 is also representative of a coater, but it is not intended to be limited. The coater may be a sprayer, a doctor blade, or the like.

With reference to FIG. 4, and in this embodiment, the printer continuously deposits and cures layers (typically foam) to build a three-dimensional article layer-by-layer. This can be viewed as a steady-state process in a reference frame fixed with respect to the slot-die head 400. In particular, foam is dispensed through the slot-die head at constant volume flux (flow rate) $\dot{Q}$ while maintaining a constant gap spacing $h_{gap}$ and surface speed $u_S$. This results in a uniform foam layer with equilibrium height $h_l$ downstream, which is subsequently cured by UV patterning at the downstream distance L.

During printing, and typically under programmed control, the slot-die head is translated radially outwards to accommodate the accumulation of previous foam layers deposited on the roller. This motion depends on the thickness of the deposited layer $h_l$ and the speed $u_s$. The latter is simply the speed at the outer surface of the previously-deposited and cured foam layer(s), which have accumulated height $h_s$ from the roller surface at the location directly underneath the slot-die head. The speed $u_s$ is related to the angular rotation rate $\dot{\theta}$ of the roller by the following relationship:

$$u_s = (R + h_s)\dot{\theta},$$

where R is the radius at the roller surface.

As explained, the system is controlled to maintain constant speed u s and layer height $h_l$, which prescribes a constant flow rate of foam through the slot-die head. In a representative implementation, the volume flux $\dot{Q}$ of foam through the slot-die head is suppled by volume displacement of a progressive cavity pump, although this is not a limitation. Depending on the method of foam generation, the pump may be in direct contact with the foam, or otherwise a liquid resin that transitions to a foam at a certain location along the conduit path connecting the pump and the slot-die (e.g., a resin with dissolved gas expands into a foam at a specific location prior to exiting the slot-die) may be used. In any case, preferably the mass flux at the pump and through the slot-die are equal during steady dispensing.

During printing, a control system (e.g., a microcontroller or computer system under program control) is configured (i) to adjust a relative position of the coater and the image source with respect to the roller surface (or the accumulated layers), and (ii) to adjust the speed of rotation of the roller itself, in both respects continuously, as each layer is built, layer-by-layer. In this particular embodiment, the relative position control moves the coater and image source away from the roller, and the roller speed control slows the roller down with respect to the speed in a prior rotation. In a further variant, and in lieu of moving the image source relative to the roller surface, a variable focus projector (or the like) may be used to adjust the focus of the image. Preferably, the position adjustments and rotation speed changes are continuous as a particular layer is being printed (as opposed to being carried out in a step-wise basis when a next layer is about to be printed). As both the relative positioning of the coater and image source components and the rotation speed are continuously adjusted, the control system maintains a constant flow of foam and a constant exposure time.

At the conclusion of the printing process, uncured material is removed from the substrate ("cleaned and washed"), and then post-cured. One or both of these operations are optional. The clean and wash may be carried out in any manner including thermal, physical, pneumatic, or chemical means. A thermal embodiment includes warming the material so that its viscosity drops and allowing the uncured material to separate from the cured material, e.g., by gravity (drip dry). A physical post-processing may include a spinning or rotating process that pulls uncured material from the part using centripetal force (e.g., a spin dryer). A pneumatic post-processing may use an air knife to help remove uncured material from the cured matrix. A chemical post-processing may involve a chemical or solvent bath to remove uncured material from the matrix. Post-processing operations may be carried out in any order.

Conventional vat photopolymerization techniques typically involve producing layers of an article by additively combining cross-sectional areas of a given height or layer thickness. Layers are deposited by repeatedly raising and dipping an element into a large vat of material, with the layers then built on an XY plane, with height in the Z plane. The technique of this disclosure, in contrast, instead utilizes a rotating element (a drum, typically cylindrical) onto which a thin photopolymer layer is deposited, preferably across an entire width of the drum. After deposition, light is patterned onto the drum, partially polymerizing the polymer in a spatially and energetically precise manner. As the printer drum rotates, a coating system and imaging system are indexed away from the rotating drum by one layer thickness, thus allowing a next layer to be coated directly on top of the previous layer. Printing layer-by-layer in this manner ("roll-on-roll") typically is conducted continuously and with high material efficiency. The notion of "continuous" printing is not meant to foreclose circumstances where the print is stopped at a certain place to change materials, add external elements (inserts for electronics, mechanical assemblies, fasteners, and the like.

Following printing, the partially polymerized polymer (which may be foamed) is removed from the drum and uncured resin is removed and sent to a filter system for re-use in a subsequent print. This operation may be carried out in an automated way using robotics. Due to the partially polymerized state of the material (e.g., gelation <60% cure), the once curved material can then be formed (e.g., laid flat), where a final cure can occur if necessary, e.g., as is the case with standard vat photopolymerization. The gelation percentage will vary depending on the photopolymer material employed, and certain materials may be suitable for even lower gel points, such as 10%. Essentially, it is desired to cure (crosslink) the polymer enough so that it can hold the patterned shape and survive the print and post-cure, but still be flexible/compliant enough to unroll and mold to a final desired shape. Further, certain resin chemistries allow for a dark post-cure, which the reaction continues even after the light is turned off, and this approach may be implemented here as well. This roll-on-roll approach also lends itself to curing in an arbitrary position, such as in a layup tool or mold, or otherwise during manufacturing of a part. For example, partially cured sheets may be applied in situ onto some other existing structural elements, where the full curing can then take effect. Another embodiment entails patterning layers at different degrees of gelation cure (e.g., one or more first layers at 60%, one or more later layers at 90%) such that when the material is pulled from the roll, it exhibits different degrees of gelation within the same structure. In still another embodiment, layers are patterned with different degrees of gelation cure, such that when the material is pulled from the roll it exhibits locally-controlled mechanical properties. Generalizing, and because a degree of curing of the photopolymer material depends on the amount of irradiating light, variations in light intensity or grayscale may be used to control the degree of curing, and thus the mechanical properties, of localized areas or portions of the material.

Figure 5:
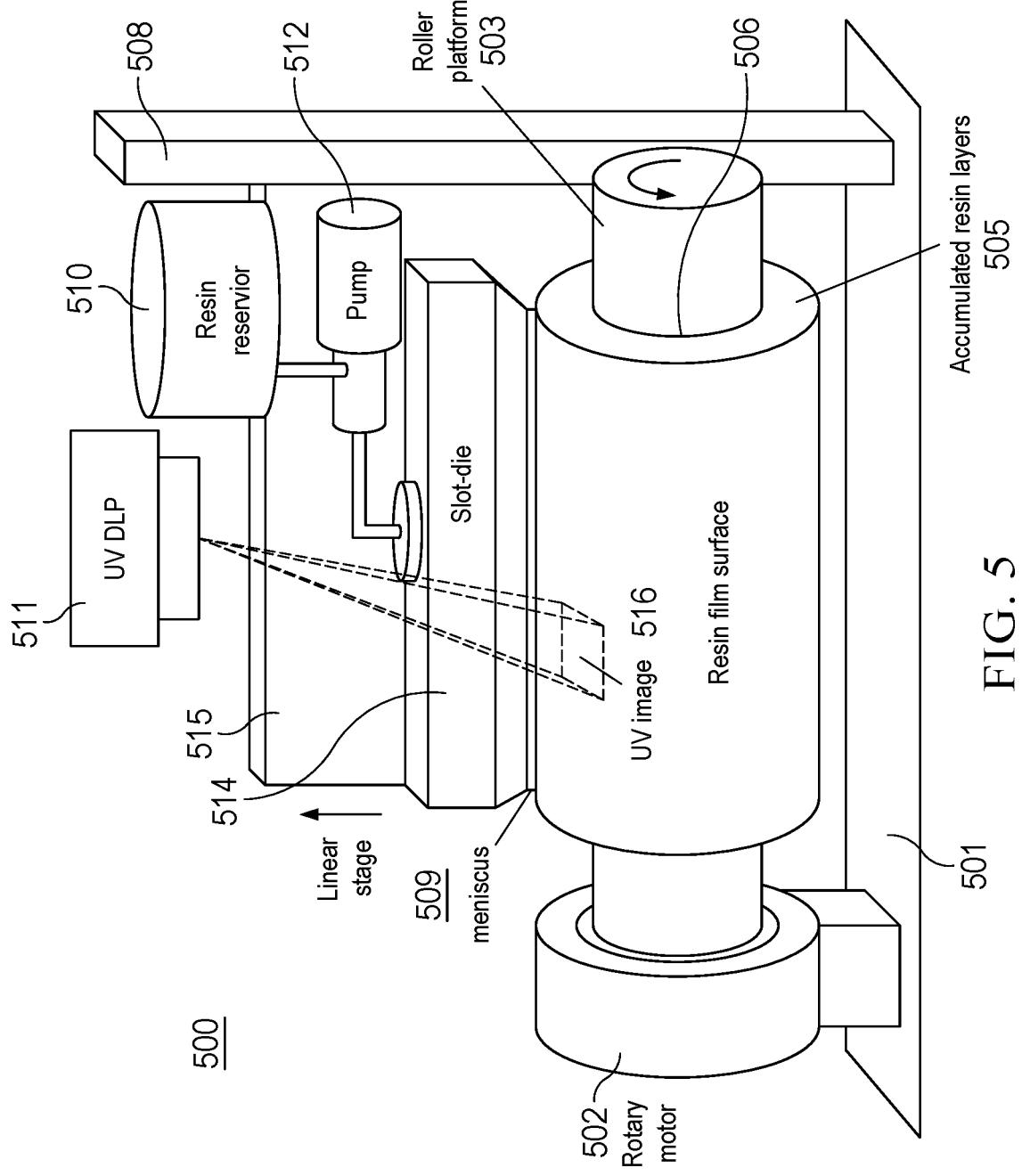
FIG. 5 is a simplified depiction of a roll-on-roll additive manufacturing printing apparatus according to this disclosure.

FIG. 5 depicts a first embodiment of a printer apparatus 500 for roll-on-roll printing according to the above-described approach. As shown, the apparatus 500 comprises a print bed 501 that includes a rotary motor 502 for driving a rotating element, designated as roller platform 503. Typically, the roller platform 503 is cylindrical, although this is not required, as the platform may have other shapes such as elliptical, polygonal, etc., and the platform may be symmetrical or asymmetrical in cross-section. The roller platform supports an article 505 that is being additively manufactured layer-by-layer. While the first (initial) layer of the article may be made on the roller platform itself, preferably a backing sheet 506 is laid down initially (on the platform) and the article built on top of the backing sheet. The backing sheet may comprise a composite material, e.g., waxed on one side that supports the layer(s) being deposited, and unwaxed on the other. The backing sheet typically is designed for a single use; after the article is built, it is removed. The backing sheet, however, can be multi-use. Inclusion of the backing sheet simplifies maintenance and thereby increases yield, as it obviates cleaning of the roller platform after every use. The backing sheet may be configured to be positioned on the platform discretely, or continuously, with the active portion of the backing sheet then removed following removal of the article.

In this embodiment, a gantry 508 supports both a coating system 509, and an imaging system 511. As viewed in FIG. 5, the gantry moves forward or backward to position the coating and imaging systems relative to the roller platform, which in this embodiment is stationary. The coating system 509 comprises a resin reservoir 510, a pump 512, and a slot-die 514. These elements are mounted on a support 515 that is movable linearly up and down (in this view) with respect to the gantry 508 that is moving forward or backward. As shown in this view, the slot die 514 typically has the same length as the article being built. Thus, and although not depicted, typically the slot-die 514 is configured for lateral movement relative to the roller platform. The imaging system 511, which includes a projector and scanner, generates an image pattern 516 (focused or otherwise) that produces the desired pattern as the roller platform 503 rotates. In particular, as the roller platform 503 rotates, the coating system 509 deposits a thin layer of photopolymer material across the width of the rotating drum and, after deposition, the imaging system 511 applies the image pattern 516 onto the drum. As was depicted in FIG. 4, the drum continues to rotate to form a new layer, with the coating system and imaging system indexed (upwards in this view) from the rotating roller platform by one layer thickness. There are two methods by which the system can move with respect to the coater/projector and build surface: (i) discretely after each layer (a jump), or (ii) it can move continuously as the roller rotates (a scan), the latter being a preferred approach. After the article is built layer-by-layer in this manner, it is removed from the roller platform, and the backing sheet 506 (on which the article is built) discarded. As noted above, preferably the material is only partially polymerized, and the rolled article is the unrolled or further processed as necessary.

Figure 6:
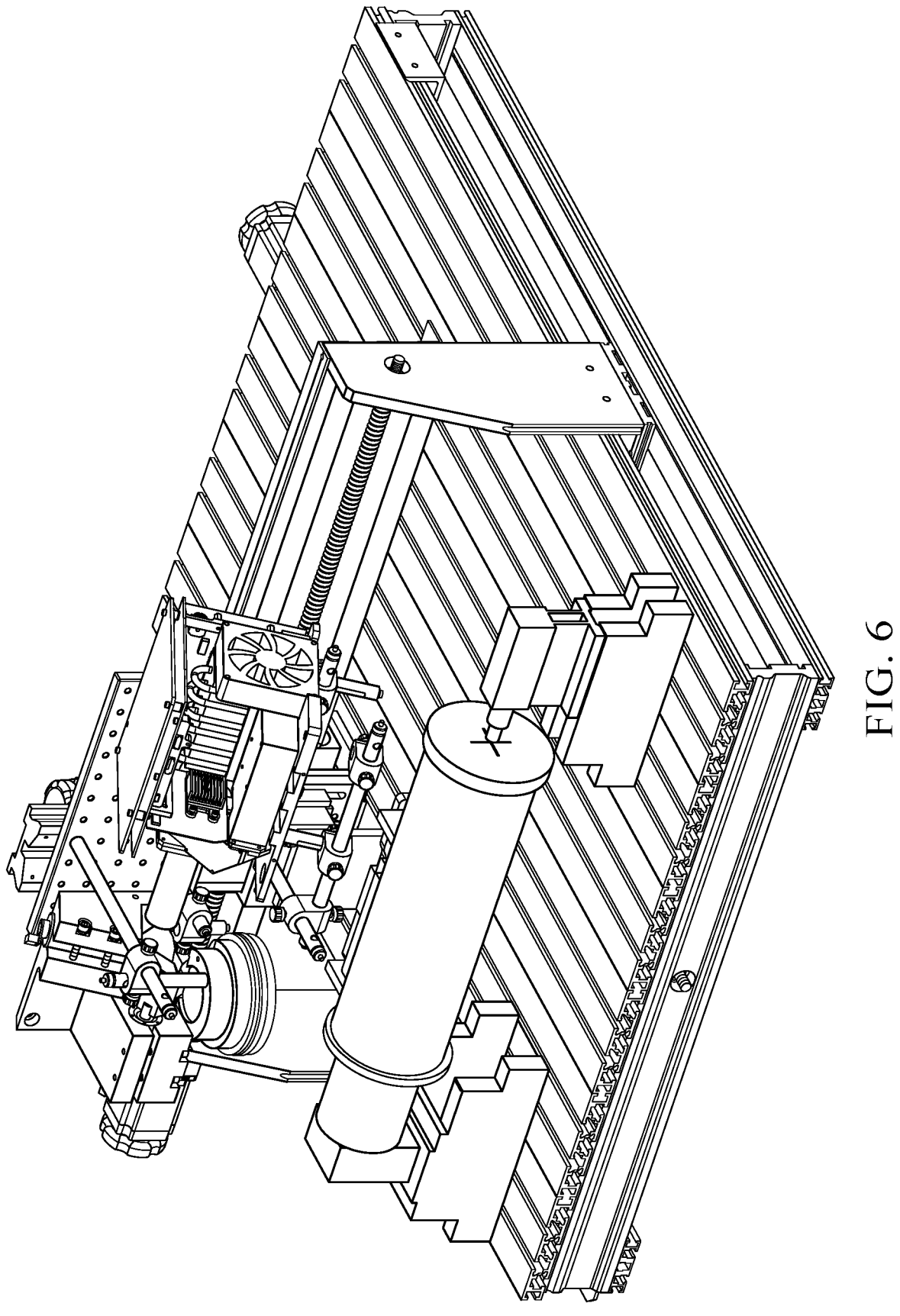
FIG. 6 is a detailed perspective view of a first embodiment of a high throughput, high resolution printer of this disclosure.
Figure 7:
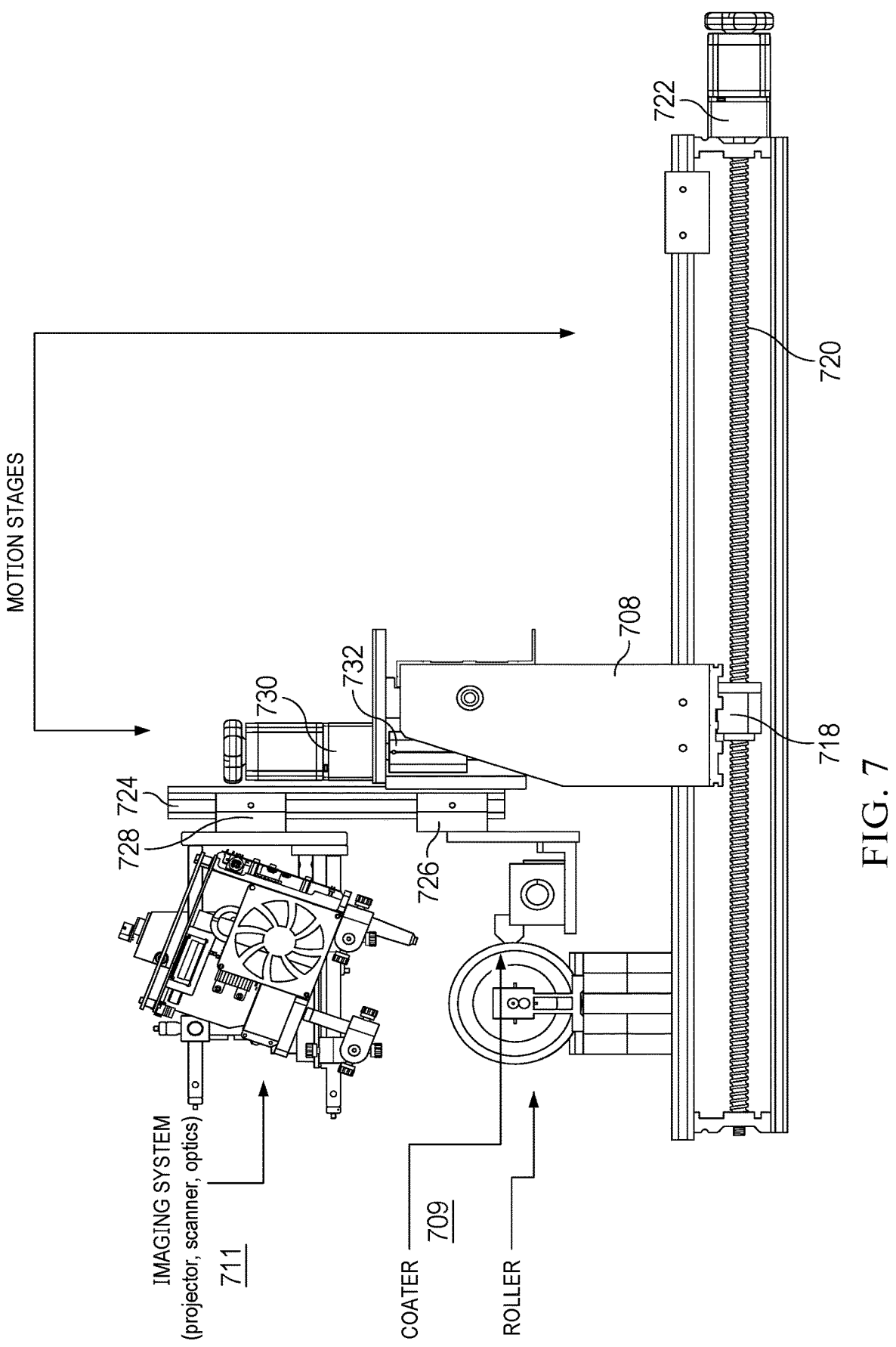
FIG. 7 depicts another view of the printer showing the various motion stages in additional detail.
Figure 8:
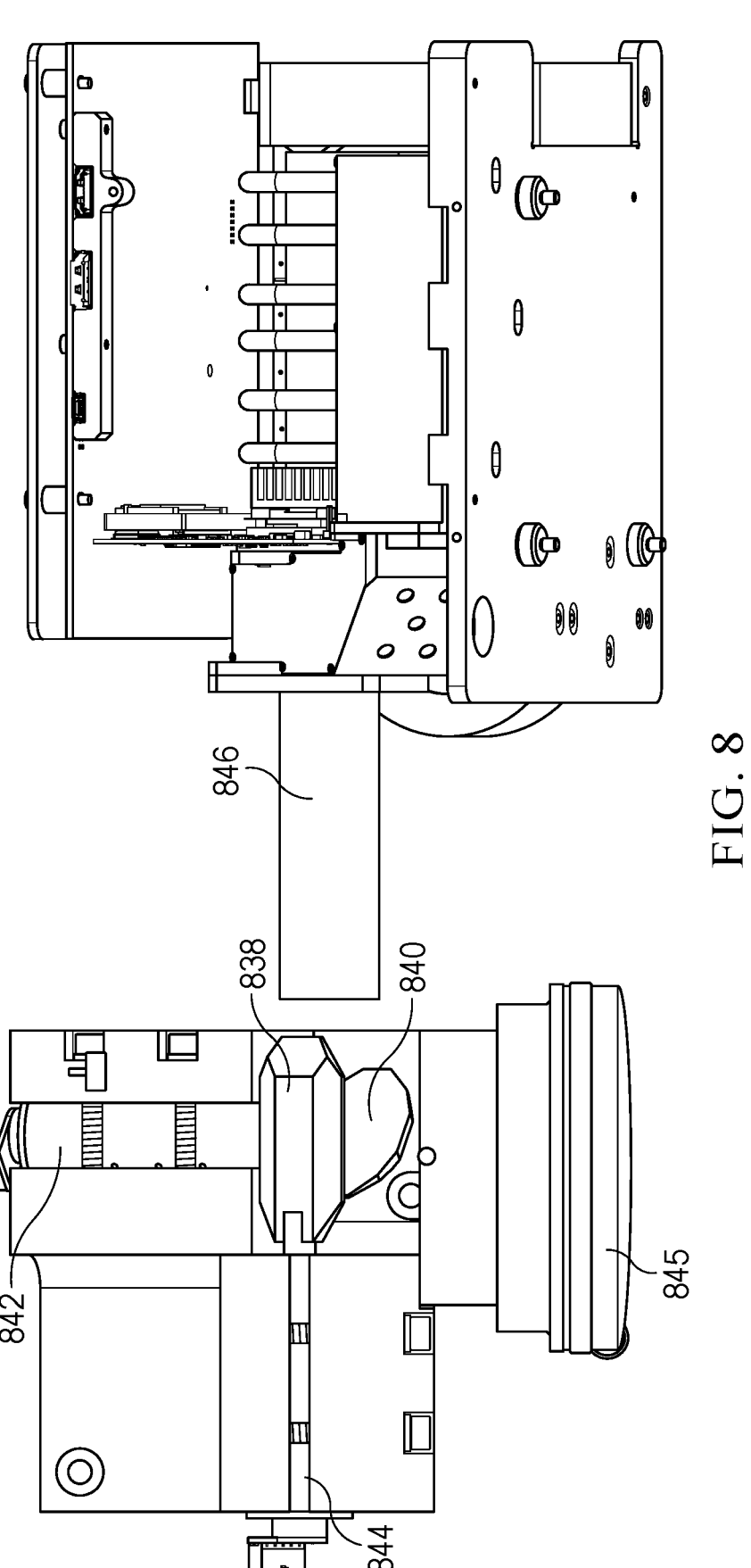
FIG. 8 depicts several of the imaging system elements of the printer.

FIGS. 6-7 depict the printer of FIG. 5 in additional detail. FIG. 6 is a perspective view, and FIG. 7 is a side (elevation). As shown in FIG. 7, the gantry 708 is supported on a coupling 718 that moves left to right (in this view) on a ball screw 720 driven by drive motor 722. The coating system (or "coater") 709 and imaging system 711 are supported on an upstanding optical rail 724. A position of the coater 709 on the rail 724 is adjustable by positioning a carriage 726; likewise, a position of the imaging system 711 on the rail is adjustable by positioning a carriage 728. In this embodiment, the relative positions of the coater 709 and imaging system 711 with respect to one another remain fixed (during the print operation). After each layer is printed, a drive motor 730 drives a ball screw 732 to index the optical rail 724 upwards so that a next layer may then be deposited. Although not shown in this view, both the coater 709 and imaging system 711 are also configured to move in and out (relative to the view being depicted). FIG. 8 depicts the components of the imaging system 811 when viewed from the front. As shown, and in this embodiment, the imaging system 811 comprises a scanner 834, and a projector 836 that includes the DMD. The projector 836 comprises minors 838 and 840, an X galvo 842, an Y galvo 844, and an output lens 845 (e.g., an to lens) that corrects a field of view of the image. The projector 836 comprises lens tube 846, which collimates or focuses be UV image produced by the projector. The projector tiles the image using the galvos/mirrors. While a lens tube is used, other optical elements (e.g., lenses, beam expanders, etc.) may be used for shaping, collimating, focusing and steering.

The 3-axis printer configuration depicted is not intended to be limited. In another embodiment, the coater and image projector are configured to move independently of one another yet still relative to the fixed rotating drum. In this embodiment, the coater moves only in a Y direction, and the projector moves in a Z direction.

Figure 9:
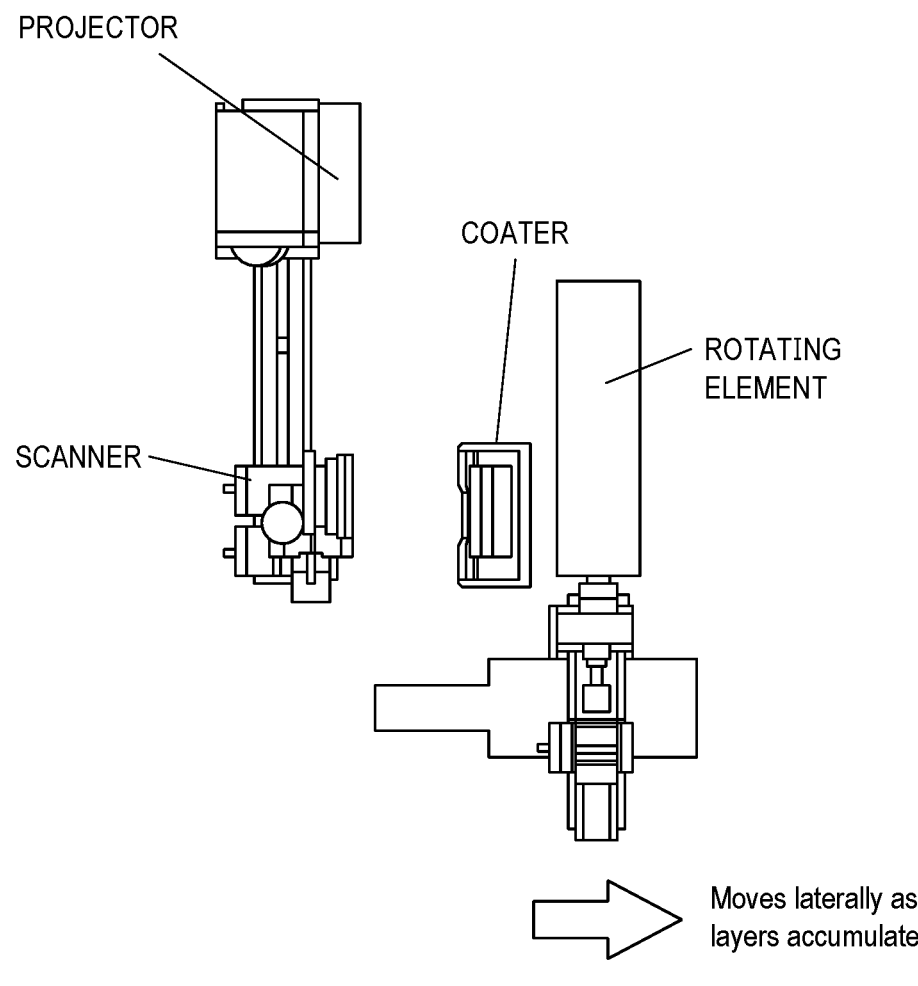
FIG. 9 depicts a second embodiment of the printer.

In yet another embodiment, the coater and the image projector are themselves fixed, with the roller platform then mounted for movement (e.g., in an Y direction) on a linear axis. This configuration is depicted in a plan view in FIG. 9.

Generalizing, the technique of this disclosure provides for layer-by-layer additive manufacture on a platform element that rotates with respect to the coater and/or projector, with the relative positions of the coater and/or the coater/projector being adjusted as a layer is being formed (a scan) or after each layer (a jump) of the article is formed. As has been described, it is not required that any particular component (the rotating platform element, the coater, or the projector) be fixed, as long the relative movement of the components is achieved.

An electronic control system is used to control the operation of the printer. To this end, one or more computers (e.g., servers, network hosts, client computers, integrated circuits, microcontrollers, controllers, field-programmable-gate arrays, personal computers, digital computers, driver circuits, or analog computers) are programmed or specially adapted to perform control tasks, such as: controlling the operation of, or interfacing with, hardware components of the printer system, including the digital micromirror device (DMD), motors, pumps, valves, and sensors; creating or accessing a digital representation of an object to be fabricated and, based on this digital representation, to control shapes of spatial light patterns projected by the DMD to fabricate the object by photocuring; as depicted in Fla 4, controlling motion of the rotating platform and synchronizing this motion with projected light images, e.g., by controlling timing of steps taken by stepper motors and timing of images projected by a MID; receiving data from, controlling, or interfacing with one or more sensors; and performing other calculations, computations, programs, algorithms, or computer functions as necessary to facilitate control over the above-described printer or process. For example, software in the control system enables real-time relative positioning of the rotating platform, coater and projector to ensure that the projected light hits and penetrates the layer surface in a precise manner to ensure proper formation of the layer. One or more thermal cameras may be used for thermal measurement to facilitate software-driven compensation techniques for photopolymerization. In lieu of thermal cameras, a photo-fluorescent dye may be used with a regular camera (e.g., a CMOS-, or CCD-based camera) to enable the control system to quantify how much light is exposed on the photopolymer and then make adjustments with respect to the next layer being printed. As a further variant, real-time layer measurement is implemented with axial laser intensity measurements. In this approach, a laser with a large spot size is set up on one end of the roller and at the edge of the slot die coater, and it is aimed at a receiver on the opposite edge of the roller. Intensity measurements are then used as real-time feedback for layer height/gap height. Similarly, a laser displacement sensor, or other thickness measurement device (e.g., an ultrasonic sensor) may be used to obtain coating thickness measurements and make adjustments during the printing, process.

Generalizing, the above-described control system ensures that the rotating platform operates continuously as the article is made, slowing down rotations and altering material deposition as the layers accumulate. The control system also maintains a constant linear velocity of the surface of the roller relative to the coater as the layers accumulate. As compared to known cartesian-based implementation, the print operations themselves are carried out without starting or stopping, or changing directions.

Figure 10:
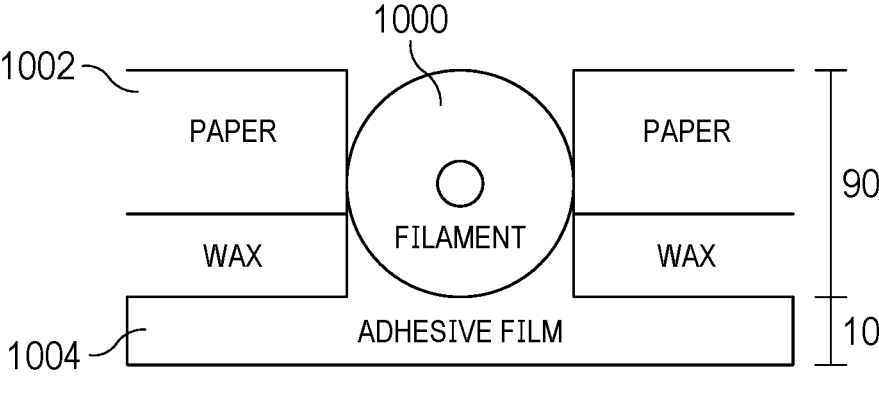
FIG. 10 depicts a structure of a backing sheet.
Figure 11:
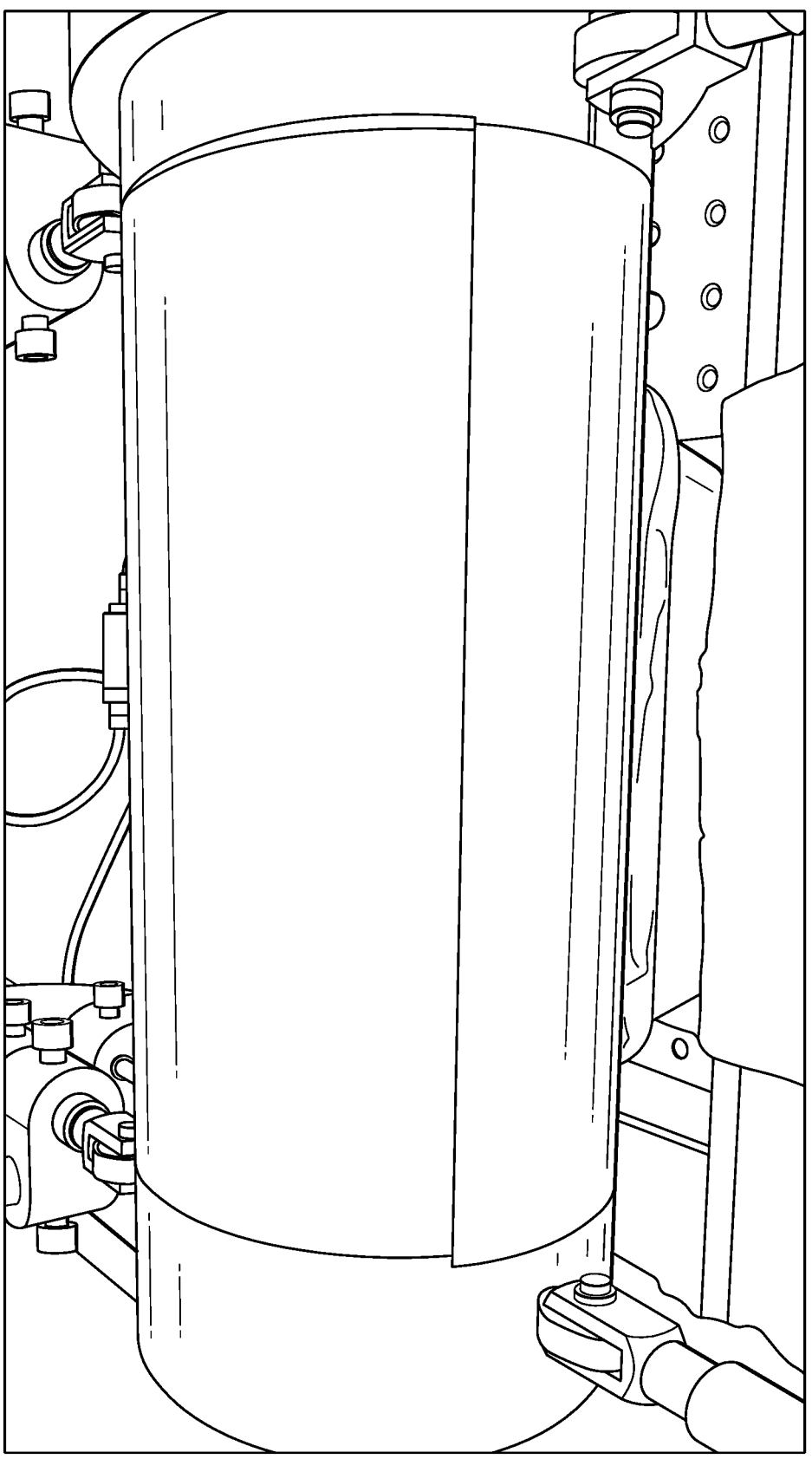
FIG. 11 depicts the backing sheet provisioned on the rotating drum in further detail.

As noted above, preferably the article is manufacturing on top of a backing sheet (a substrate) that overlays the rotating element (the rolling build surface), which is typically formed of metal (e.g., aluminum, steel, stainless-steel, etc.) or a composite (e.g., fiberglass, or carbon fiber). FIG. 10 depicts a cross-sectional view of the preferred structure of the backing sheet, which acts as a processing aid with "quick release" properties that facilitates quick change overs between prints. As depicted, the product comprising a filament tape 1000 used to release the print. The paper 1002 is waxed on one side. Freezer paper may be used for this purpose. The waxed side has an adhesive edge 1004 on both ends to adhere it to the printing cylinder. In an example embodiment, a 12" long piece of filament tape (e.g., 3M knifeless tape "design line") is placed in a U-shape on an aluminum roller. The shape is 7.5" wide by 2" tall. A 7.5"×12.5" sheet of freezer paper is used as the backing paper; as noted, the paper is waxed on one side. The edges of the waxed side are coated with a ¼" wide glue stick adhesive to adhere the edges down to the aluminum cylinder. The paper is 90 microns thick, and the filament tape is less than 100 microns. When printing, is finished, the design line is used to separate the sheet from the aluminum cylinder and a new sheet is then configured. FIG. 11 depicts the drum with the backing sheet affixed.

In an alternative embodiment, the backing sheet is applied from a roll and in an automated process.

Because printing does not require starting, stopping or changing directions of the build platform, the printer can operate continuously during the actual print operations. This enables large articles to be printed on the drum at high speed, and preferably up to a low gel point (e.g., in the range 10-60% cross-linking depending on the material). Upon removal, a final curing (flat or in a mold) is then carried out to a verified state (>90% cross-linking cure). In addition, and after any uncured resin is removed, other post-processing may be carried out. One post-processing technique that may be used to remove uncured resin involves heating the material, causing the liquid foams to rapidly decrease viscosity, and then letting them drain. Heating may be carried out with convection, conduction or radiation (e.g., microware or RE). Draining can occur either naturally by gravity, pneumatically with an air-knife curtain, by vacuum, or mechanically with a spin-dry cycle.

The printer may be used to make an out-of-round object concentric.

Different materials may be applied by the coater for different layers of the article.

Figure 12B:
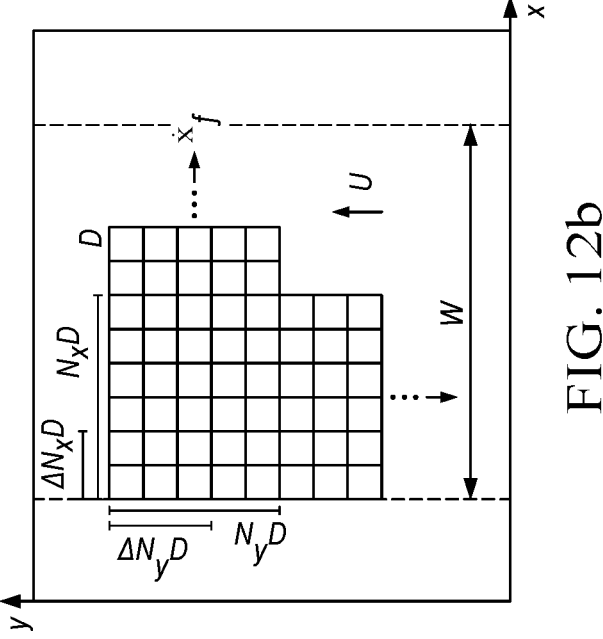
Figure 12A:
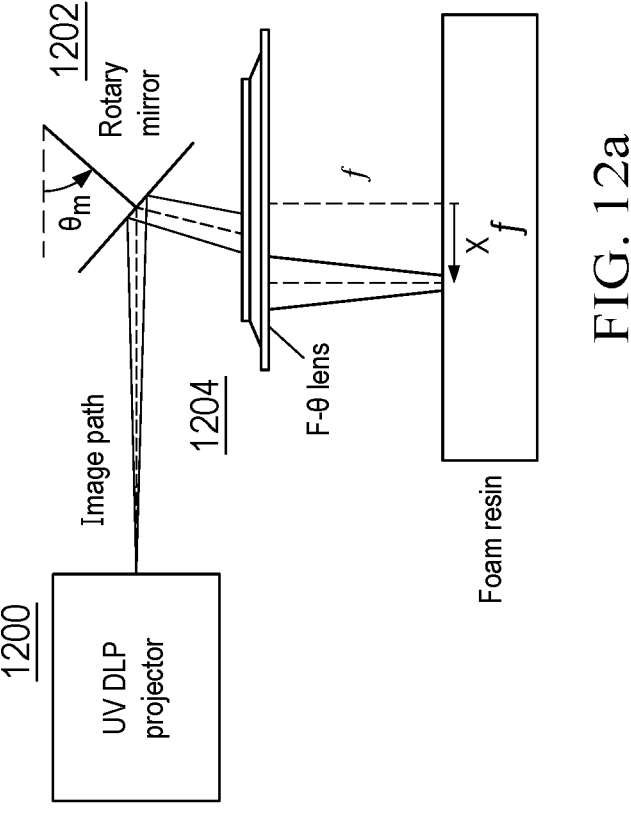
FIG. 12a depicts a schematic diagram for foam patterning using a DLP projector source according to the techniques described herein.

FIGS. 12a-b depict a schematic diagram for foam patterning using a DLP projector source according to the techniques described herein. FIG. 12a illustrates a projected image focused to a region on the foam surface by a lens (e.g., 845 in FIG. 8), and line scans are performed by rotation of galvo mirrors (only one is shown); FIG. 121 is a top-down view of the foam surface with image patterning details. In this example embodiment, the foam resin patterned using a DLP projector 1200 and UV light source, which emits a rectangular $N_x \times N_y$ pixel image, noted in reference to the $\hat{x} \times \hat{y}$ projector coordinates with respect to the foam's surface (FIG. 12b). The image path is positioned by reflection from two galvo mirrors (mirror 1202 is shown) before it passes through the $f_\theta$ lens 1204 (or other scanning, lens, lens array or system) and focuses onto the foam. Each galvo mirror is computer-controlled and rotates about one axis; these axes are perpendicular to one another and correspond to steering, the bean by angles $\theta_x$ and $\theta_y$ with respect to the normal coordinate of the foam surface (i.e., a 2-direction in FIG. 12b). The $f_\theta$ lens works by converting the incident angle of the image path into a translation of the image focal point from the lens center, scaled by the focal length f, i.e.

$$x_f = f\theta_x$$

$$y_f = f\theta_y$$

The result is an image projected onto the foam centered at coordinate $(x_f, y_f)$ with rectangular area $A_{DLP} = N_x N_y D^2$ where P is the pixel size, A large-area pattern is created by translating the image across the foam in discrete steps per frame exposure.

Figure 13B:
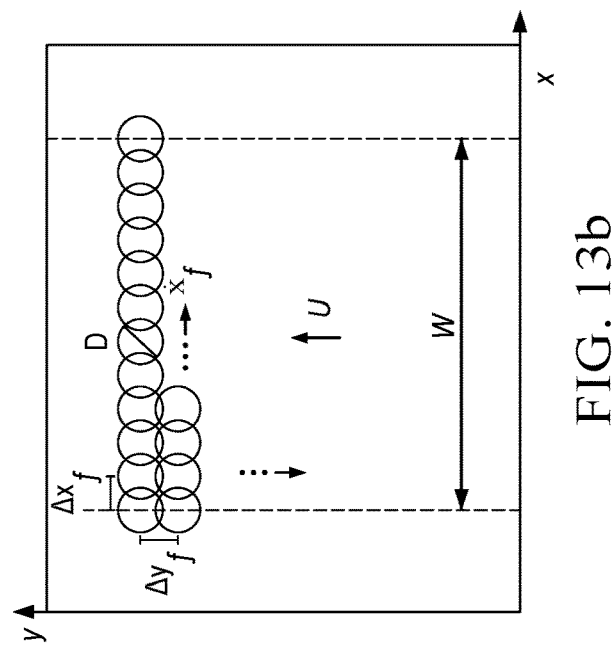
Figure 13A:
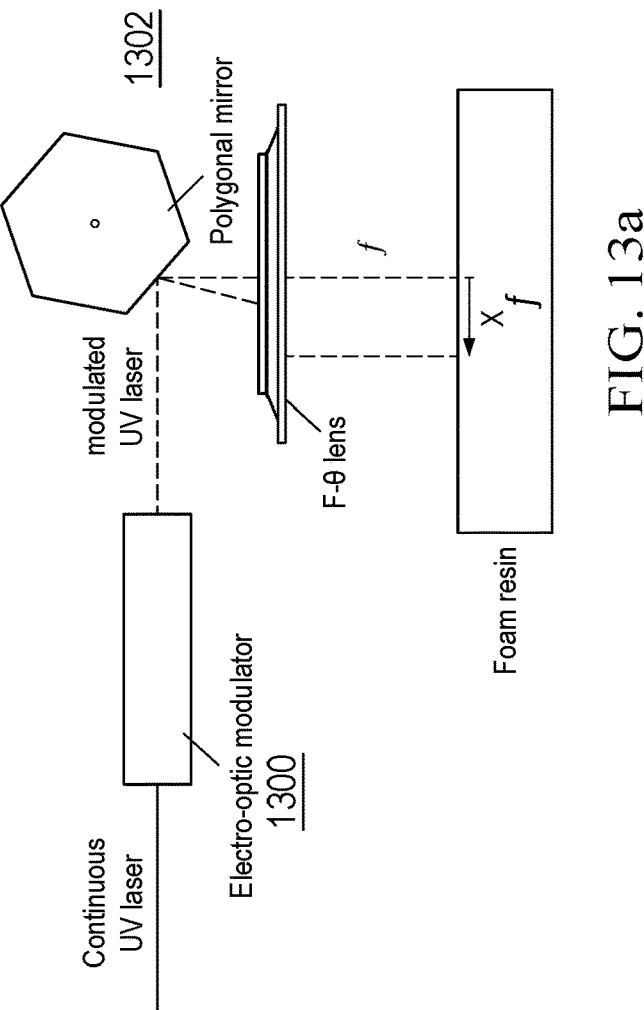
FIG. 13a depicts a technique for point-wise patterning using a laser beam with programmable modulation.

Another approach to patterning is point-wise patterning. As depicted in FIC. 13a-b, the foam resin is patterned using a UV laser beam with programmable modulation. FIG. 13a depicts a modulated laser beam focused to a spot on the foam surface by the lens, and line scans are enabled by rotation of a polygonal mirror 1302; FIG. 13b depicts a top-down view of the foam surface with laser patterning details. The pattern of modulation for the laser beam changes the laser spot intensity over the course of traversing each scan line to create the desired pattern. Two embodiments for generating the modulated laser beam are: (i) a continuous laser beam passed through an electro-optic modulator 1300, which programmatically modulates the laser beam intensity from 0-100%; and (ii) laser diode (not shown) modulated on or off by an integrated circuit processor. The former approach enables higher laser powers and greyscale capability, however, the modulation rate is typically slow compared to the later. Patterning resolution is determined by the lasers focused spot diameter D. and the fractional overlap of the spot diameter per modulated exposure in the x and y directions, namely, $\eta_{\Delta x}$, $\eta_{\Delta y}$ respectively (FIG. 13b). The laser traverses the foam in x-direction scan lines at speed $\dot{x}_f$ and the foam translates in the y-direction at speed U; each row of length w is patterned sequentially and in time $t_w$.

As noted above, the above-described printing techniques may comprise a front-end of a system that includes various types of post-processing. The following provides additional details regarding post-processing options. For example, after accumulation of the material and patterning is complete, the patterned material may be taken off the roll, cleaned and cured. As previously noted, the order of the post-processing operations may vary depending on the end goal of the processing. Removal may involve dissolving glue that binds the sheet to the roller, or, if glue is not used, having a pull strip. Another approach to removal is providing a vacuum source in association with the rotating cylinder that sucks down the paper, with the vacuum then being turned off when removal from the cylinder is complete. A blower may then push the paper off the roll, e.g., and onto a conveyor belt. An alternative to applying a vacuum may be to apply heat, and then blowing the material off. Cleaning may involve chemical approaches (e.g., a solvent bath), using an air-knife, applying a thermal source, or using a mechanical technique (a spin dry). Curing may include a light bath, a secondary cure using heat, or using an RF source. The post-processing may comprise part of an end-to-end system that includes the patterning.

As also mentioned, it is known in the art that, when curing photopolymers, the degree of cure of a photopolymer can be varied by the amount of light irradiation dose. Therefore, it is possible to use light intensity to control the degree of cure, and this controls the mechanical properties of a printed article. This technique can be combined with the subject matter described to fabricate a functionally-graded article with tuned mechanical properties. A combined technique of this type then provides a notion of 4D printing (with 3D being shape and the added dimension being time). In this approach, the degree of cure of different layers throughout the article is varied at the voxel level. This allows multi-material-like properties within the same printed piece, using the same material (although using different materials on the same build is also within the scope). This allows the printed article to account for things like shape memory effects or to encourage different shapes post-printing, e.g., as activated by temperature, moisture, light, or the like. A 4D printing approach also aligns naturally with the approach herein as printed materials will naturally have a curl to them, due to being printed on a rotating element.

Generalizing, different layers may exhibit differing degrees of cure. For example, a top layer may have a 90% cure, whereas an underlying layer may have a 30% cure. By leveraging differing cure rates across one or more layers, the resulting structure can be readily folded into a desired shape during post-processing.

The techniques herein may also be used in combination with volumetric printing. Volumetric printing concurrently prints all points of a 3-dimensional object by illuminating a rotating volume of photosensitive material within a transparent container at specific points and at varying light intensities and at differing angles. In the combined approach, volumetric-like printing (e.g., involving multiple point sources at varying light intensities and/or angles) concurrently cure all points of a 3D object within the material deposited on the roller. For example, optical projections provided at a plurality of angles and with calculated 3D intensity distribution act over a fixed temporal exposure period to selectively cure portions of the photopolymer. This is carried out on individual layers, or across multiple layers of the build. In this manner, volumetric printing and the technique herein are combined, on a layer-by-layer basis (or otherwise across multiple layers), to fabricate an article composed of multiple volumetrically-printed layers or regions.

Preferably, and when the photopolymer is a radiation-curable foam, the foam dispensing is carried out in an automated manner and "on-demand" (meaning the foam is produced "just-in-time" to facilitate the printing of the current layer while the foam remains stable), once again under program control, so that the layer(s) are built up in a continuous manner.

The material being printed may be a photopolymer that includes a composite material filler. Representative filler materials include ceramics, metals, organic carbon fibers, and other organic or inorganic materials.

While the above describes a particular order of operations performed by certain embodiments of the described subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular 3D printing machine or system that is specially constructed for the required purposes, or an existing commercial 3D printer that has been adapted to print using the above-described foam and foam dispensing mechanism.

While the above description describes the system in the context of foamed materials, this is not a requirement as the techniques and system may be implemented using non-foamed materials.

Further, while the approach typically involves processing of liquid photopolymers, solid and semi-solid photopolymers may also be used. This may be in the form of coating techniques using a liquid binder or direct application of powders directly to the roll using a suitable coating technique such as heat, light, static electricity or the like. Once applied to the rotating element, the material may be cured through light radiation as previously described.

The techniques herein using a rotating build platform may also have applicability in other materials processing applications, including non-photopolymer materials such as powdered thermoplastics, ceramics, metals, composites thereof, and the like.

Depending on the desired size of the article being manufactured, it may be desirable to position and use multiple printers or printer components (i.e., the optical system, the coating system, or otherwise) adjacent to one another in a continuous manufacturing process. For example, if the desired workpiece is nine (9) feet in length and an output of a single printer is, e.g., three (3) feet in length, then the desired workpiece may be formed by using three such machines in series.

What is claimed is as follows:

1. A method of additive manufacturing an article, comprising:
    providing a rotating element having a surface;
    depositing photopolymer material directly on the rotating element at a given flow rate, the photopolymer material being deposited by a coater having an outlet adjacent the surface;
    after depositing a given layer, projecting an image onto the photopolymer material for an exposure time to cure the given layer; and
    as the photopolymer material is deposited layer-upon-layer, and for each layer: (i) continuously adjusting a relative position of the coater with respect to the surface; (ii) continuously adjusting a speed of rotation of the rotating element; and (iii) maintaining constant the flow rate and the exposure time.

2. The method as described in claim 1 wherein the coater is translated radially outward based on a thickness $h_l$ of the given layer, and a speed $u_s$ of the rotating element with respect to one or more previously-deposited and cured layers, wherein the one or more previously-deposited and cured layers have cumulative height $h_s$ from the surface, and wherein the speed $u_s$ is related to an angular rotation rate $\dot{\theta}$ of the rotating element by:

$$u_s = (R + h_s)\dot{\theta},$$

where $\overline{R}$ is a radius of the rotating element at the surface.

3. The method as described in claim 1 wherein the photopolymer material is a radiation-curable foam.

4. The method as described in claim 1 wherein the photopolymer material is cured up to a low gel point.

5. The method as described in claim 4 wherein the low gel point is between 10-60% gelation, and wherein the given state is greater than approximately 90% cross-linking.

6. The method as described in claim 1 further including removing the article from the rotating element and continuing to cure the photopolymer material to a given state.

7. The method as described in claim 6 further including:
    removing uncured photopolymer material; and
    applying a post-processing operation to cure the photopolymer material to the given state.

8. The method as described in claim 7 wherein the photopolymer material is cured to the given state by flat curing or by curing in a mold.

9. A method of additive manufacturing, comprising:
    as a support element having a surface rotates, and while maintaining a constant flow rate from an adjacent material outlet and a constant exposure time of an associated radiation source:

depositing a first layer of photopolymer material on the surface;

exposing a first image onto the first layer to cure the first layer;

depositing a second layer of the photopolymer material on top of the cured first layer; and exposing a second image onto the second layer to cure the second layer;

wherein a relative position of the material outlet with respect to the surface, and wherein a speed of rotation of the element, are adjusted continuously during the depositing and exposing operations.

* * * * *

14